Patented Aug. 11, 1931

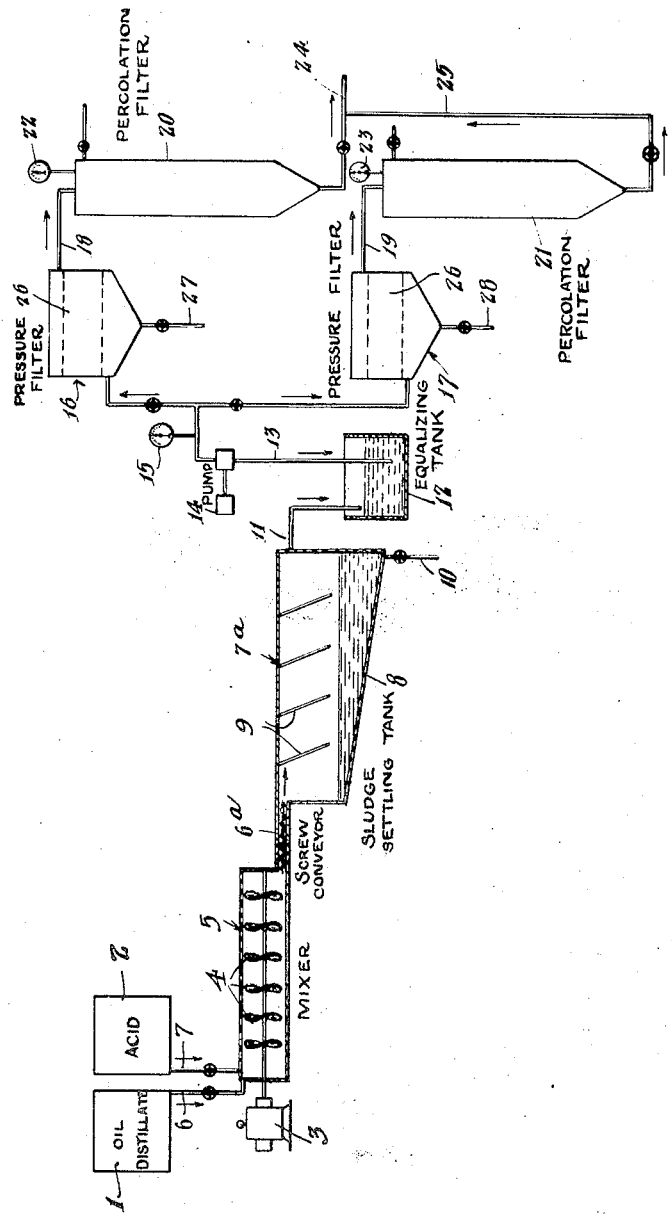

1,818,488

UNITED STATES PATENT OFFICE

ARTHUR L. LYMAN, OF BERKELEY, CALIFORNIA, ASSIGNOR TO STANDARD OIL COMPANY OF CALIFORNIA, OF SAN FRANCISCO, CALIFORNIA, A CORPORATION OF DELAWARE

PROCESS FOR REFINING HYDROCARBON OIL

Application filed October 6, 1926. Serial No. 139,837.

This invention relates to the art of refining hydrocarbon oils and is particularly useful in the treatment of lubricating oil stocks from petroleum oils.

In the refining of hydrocarbon oils, it is often the practice to treat the oils with acid, such as sulfuric acid, or with liquid sulfur dioxide, for the removal from the hydrocarbon oil of certain undesirable bodies which impart to the oil a bad odor, poor color and poor stability. The oil resulting from the treatment is acid in character and must be neutralized in order to remove acid reaction products and free residual acids which do not settle out of the oil by gravity, and in some cases to remove certain acidic constituents of the oil itself, such, for example, as napthenic acids. Some hydrocarbon oils require in addition to neutralization a decolorizing treatment, in order to further remove acid reaction products and to bring the oils to the proper color. The usual method of neutralizing oils is to contact them with a solution of caustic soda or other alkali, followed by a water wash and a blowing with air to brighten the oil. In order to bring the thus neutralized oil to proper color, it is then generally passed through a percolation filter filled with a granular decolorizing agent such as fuller's earth.

The usual caustic treatment following the sulfuric acid treatment results in an impairment of the color of the oil to an extent that low filter yields of oil of good color are obtained. Neutralization can be effected without the use of caustic soda or other alkali wash by contacting acid treated oil with certain clays in a finely comminuted form, the clay being dumped into the oil and agitated therewith, and thereafter separated from the oil by filtration. This neutralization by so-called "contact clay" may then be followed by a clay decolorizing operation, either conducted by a percolation process or by a contact process. While the so-called contact clay neutralizing process eliminates the necessity of employing caustic soda or other alkali solutions, the consumption of clay is high and the oil must be heated to such a temperature that a part of the oil is oxidized unless means are resorted to to prevent oxidization.

An object of the present invention is to provide a process of refining oils in which the oil may be neutralized after an acid treatment without the employment of caustic solutions, while still obtaining a high yield of oil per ton of clay employed.

Another object of the present invention is to provide a process for refining hydrocarbon oil in which the neutralization of the oil following an acid treatment is effected by clay at low temperatures, in order to avoid oxidation.

Another object of the present invention is to provide a process in which the oil, after an acid treatment, may be neutralized by clay which has been previously employed in a decolorizing treatment of oil, thus effecting the neutralization with an otherwise waste product.

Another object of the present invention is to provide an improved continuous process for refining hydrocarbon oils.

I have discovered that when hydrocarbon oil, such as lubricating oil stock or distillate from petroleum oil, is subjected to an acid treatment in which all of the acid employed is applied to the oil in one operation, a granular sludge is formed which can be completely removed from the treated oil by filtration through a bed of coarse granular clay. I have further discovered that by conducting the clay separation of granular sludge from the oil separate from the percolation clay decolorizing operation, a neutral high colored oil may be obtained with a high yield of oil per ton of clay employed in the process.

Various further objects and advantages of the invention will be understood from a description of the preferred form of process and apparatus for treating clay embodying the invention. For this purpose I have herein described the preferred apparatus and process as it is employed in the refining of lubricating oil stocks or distillates from petroleum oil. It is understood, however, that the invention is not necessarily limited to the treatment of this specific oil.

In the accompanying drawings the figure represents a diagrammatic view, mainly in vertical section, of an apparatus embodying the present invention.

In the drawings, 1 indicates a suitable container for the hydrocarbon oil to be treated. 2 indicates a suitable container for the acid, such as sulfuric acid, which is to be used to treat the oil. 3 represents a motor for driving paddles 4 within a mixer 5. 6 and 7, respectively, represent lines leading from the mixer 5 to the oil container 1 and acid container 2, respectively. The mixer 5 discharges through a screw conveyor 6ª into a settling tank 7ª.

The settling tank is preferably constructed for the continuous separation of the treated oil from the resultant acid sludge, which can be removed therefrom by settling. For this purpose, the tank 7ª is preferably provided with an inclined bottom 8, inclining downwardly from the inlet end of the tank 7ª to the outlet end, and the tank is further provided with a plurality of spaced apart baffles 9 extending from the top of the tank to a level approximately a foot above the position in which it is desired to maintain the top of the sludge settled within the tank. Said baffles 9 are spaced at intervals between the inlet end and outlet end of the settling tank, preferably inclined slightly forwardly. The baffles thus provide means for preventing the admixed oil and acid from agitating the contents of the settling tank and permit the acid sludge to be settled out and withdrawn separately from the treated oil through line 10.

The oil is withdrawn from a line 11 and passed preferably first into an equalizing tank 12. From the equalizing tank 12 a line 13 leads through a pump 14 and pressure gauge 15 into one of a plurality of similar pressure filters 16 and 17. A plurality of similar filters 16 and 17 are employed for alternate use where it is desired to conduct the process continuously. The pressure filters 16 and 17 are connected by lines 18 and 19, respectively, with percolation filters 20 and 21, respectively. The percolation filters are preferably provided with gauges 22 and 23, respectively, and with oil discharge lines 24 and 25, respectively, which may be joined together to pass the refined oil to a storage vessel.

The operation of the process is as follows: The oil and acid are continuously fed through lines 6 and 7 into one end of the horizontal mixer 5, which is preferably of a capacity sufficient to allow agitation of oil and acid therein until the resulting reaction is completed. The oil and acid are therein continuously agitated together and the treated oil and resulting acid sludge continuously removed from the mixer by the screw conveyor 6ª. The treating time and percentages of acid and oil employed will depend upon the character of hydrocarbon oil to be treated, and also the character of refinement desired. With a certain distillate of California or asphaltic base oil suitable for the production of lubricating oil and having a gravity of, for example, 19° Bé., I prefer to employ approximately one to one and one-half pounds of sulfuric acid per gallon of oil to be refined. The sulfuric acid is preferably of around 66° Bé. gravity. With such acid and oil, approximately one-half hour treating time is desirable within the mixer 5.

Within the settling tank 7ª, which is preferably relatively long in a horizontal direction and comparatively shallow, the produced acid sludge settles to the bottom of the tank due to the difference in gravity between the sludge and oil, the oil rising practically free of sludge to the top part of the settling tank 7ª. By conducting all of the acid refining action upon the oil in one operation, or by applying all of the acid to the oil in one application, the resulting sludge produced is granular in form and readily separable from the treated oil. An important feature of the present invention is the applying of the acid in this manner instead of the usual manner of splitting the acid into several portions for successive applications to the oil, inasmuch as the application of the acid in said latter way results in a finely divided sludge which is both difficult to separate from the oil and leaves an oil which is difficult to neutralize by clay treatment.

The process of the present invention is of particular value in treating California or asphaltic base oil when it is desired to produce what is known as "pale" oils as distinguished from "red" oils. By "pale" oils we refer to oils having a color of 9 or higher on the Robinson scale. The color of a pale oil is at its peak (its lightest) immediately after application of the acid. If the sludge produced by the acid reaction is not removed completely from the oil before contact of the oil with water or caustic, the oil will darken and a pale oil cannot be produced, except by the use of large amounts of decolorizing clay. By complete removal of the sludge as herein described through the formation of all of the sludge into granular form and its separation by percolation through a bed of clay, a pale oil can be produced with proportions of acid of 1 to 1½ pounds per gallon of 92.3 acid or 66° Baumé acid. The larger amount of acid the greater the decolorizing action on the oil, but the size of the granular sludge particles becomes smaller. Since the desire to produce the light colored oil and the desire to retain all of the sludge in granular form are opposed to each other, there is a definite range of acid for most asphaltic base oils which is required for the sucessful operation of the process.

The capacity of the settling tank 7ª is determined by the time of settling desired. Normally, with the particular character of oil and operation described, a settling time of from three to eighteen hours is required. From the discharge end of the settling tank the sludge is continuously drawn off the bottom through the line 10 and the oil continuously drawn off from the top through a line 11 and passed into the equalizing tank 12.

The treated oil at this period of the operation contains a small amount of fine sludge and acid, and to remove said sludge and acid from the oil the oil is then pumped by pump 14 through line 13 upwards through a bed of clay in one of the clay filters 16 and 17. The clay filters each preferably contain about a two or three-foot column of clay, indicated at 26, which clay is preferably of approximately 30 to 50 mesh. The inlet lines of the oil are indicated as entering the bottom of the filters and the outlet lines leading from the top of the filters, in order that the oil may pass upwardly through the bed of clay and thus any sludge separated thereby may fall to the bottom of the filters and there be withdrawn through the lines 27 or 28. Preferably a pressure is employed on the oil undergoing filtration, for example, a pressure of fifteen pounds per square inch. Two filters are employed in order that one may be shut down for recharging while the other is employed in the neutralizing operation. Within the filters 16 or 17 the oil is neutralized through the removal of acid and sludge. This acid and sludge very rapidly destroys the decolorizing power of clay employed therein and therefore the clay employed in the neutralizing operation is preferably maintained separate from the clay to be employed in the decolorizing operation. In accordance with the present invention, particularly through the use of the single application of acid and thus production of a granular sludge, the neutralizing operation may be continuously carried out without heating the oil.

The oil is passed from the filters 16 and 17 to the percolation filters 20 or 21. It is understood, however, that the decolorization of the oil may, if desired, be accomplished by a contact process, i. e., one in which the decolorizing agent is in a comminuted state and agitated with the oil. The percolation method is preferred inasmuch as the spent clay in the decolorizing operation may then be employed as the source of clay for the neutralizing operation conducted in filters 16 or 17. Within the percolation filters 20 or 21 the oil is passed downwardly through a bed of coarse or uncomminuted clay a sufficient height to decolorize the oil to the extent desired, and the oil is then passed through lines 24 or 25 to storage.

Owing to the fact that the oil which is charged through the decolorizing filters 20 or 21 is neutral and free from sludge, and also has not had its color impaired by the use of caustic neutralizing solutions, the yields of finished oil of good color obtainable is materially increased over the yields obtained by the usual processes of neutralizing oil with caustic soda before the percolation through the decolorizing clay. Such processes as have heretofore dispensed with the caustic neutralizing step have employed a percolation clay decolorizing operation in which there was obtained an oil of stable color only through the use of very low yields. The reason for the low yield with the previous processes is found in the saturation of the clay with mineral acid which destroys the decolorizing properties of the clay. The present process enables the clay to be entirely saturated with sludge in the separate clay filters 16 and 17 and thus permits several times the yield of oil per ton of clay in the percolation filters 20 and 21.

A particular advantage of the present process is that it can be carried on at a temperature below 140° F. so that there is practically no oxidation of the oil such as occurs during the so-called "contact clay" neutralizing process which is carried on at high temperatures.

The present process results in a refined lubricating oil of low organic acidity. A further particular advantage of the present process lies in the fact that it may be made continuous, if desired, and also that the production of the granular sludge permits most of the sludge to be settled out by gravity and the remainder is easily and completely removed by the pressure filter without the use of water or caustic. Since there is no opportunity for decomposition of the sludge or resolution of acid reaction bodies in the oil or the production of alkali soaps, the color obtained in the acid treatment is retained with little filtration through decolorizing clay to obtain a highly decolorized oil.

With certain distillates of high organic acidity, such as derived from some California crude oils, it is desirable at times to precede the acid treatment by a caustic soda treatment or other treatment with a solution of neutralizing agent for the purpose of removing the organic acidity. Where the caustic soda treatment precedes the remainder of the process, it does not cause the acid reaction bodies to break down and therefore does not interfere with the present process or the advantages derived thereby, but can be combined therewith with good advantage on high acidity oils.

While the process herein described accomplishes the objects of the present invention, it is understood that various modifications may be made without departing from the invention and that all of the features of the present invention are not necessarily retained in the same process, but the invention includes all such modifications and changes as come within the scope of the appended claims.

I claim:—

1. A process of refining hydrocarbon lubricating oil which requires the use of from 1 to 1½ pounds of 66° Baumé acid for removal of impurities which comprises, adding to the oil in a single treatment sulfuric acid in an amount equivalent to between 1 pound and 1½ pounds of 66° Baumé acid per gallon of oil, agitating the oil and acid, passing the oil through a bed of clay sufficient to remove substantially all of the sludge produced by the acid reaction upon the oil, and then passing the oil through a separate decolorizing operation wherein the oil is treated with a decolorizing clay.

2. A process of refining asphaltic base lubricating oil which requires the use of about 1 to 1½ pounds of 66° Baumé sulfuric acid for removal of impurities, which comprises, adding to the oil in a single step sulfuric acid in an amount equivalent to between 1 to 1½ pounds of 66° Baumé acid per gallon of oil, agitating the oil and acid, thereby forming an acid sludge of granular form, passing the oil through a bed of clay sufficient to remove substantially all of the sludge, and then passing oil through a separate decolorizing operation wherein the oil is treated with a decolorizing clay.

3. A process of refining hydrocarbon lubricating oil which requires the use of about 1 to 1½ pounds of 66° Baumé sulfuric acid for the removal of impurities, which comprises adding to the oil in a single step such sulfuric acid in an amount equivalent to between one pound and one and one-half pounds 66° Baumé acid per gallon of oil, thereby forming an acid sludge of granular form, then settling out the major portion of the acid sludge formed, and thereafter passing the oil through a bed of clay sufficient to remove substantially all of the remaining sludge in the clay, and then passing the oil through a separate decolorizing operation wherein the oil is treated with a decolorizing clay.

4. A process of refining asphaltic base lubricating oil which requires the use of about 1 to 1½ pounds of 66° Baumé sulfuric acid per gallon of oil for the removal of impurities, which process comprises adding to the oil in a single treatment such sulfuric acid in an amount equivalent to between one pound and one and one-half pounds 66° Baumé acid per gallon of oil, passing the oil upwardly through a bed of clay sufficient to remove substantially all of the sludge produced by the acid reaction which remains in the oil, and then passing the oil through a separate decolorizing operation wherein the oil is treated with a decolorizing clay.

5. A process of refining hydrocarbon lubricating oil which requires the use of about 1 to 1½ pounds of 66° Baumé acid for removal of impurities, which process comprises adding such acid in an amount equivalent to between one pound and one and one-half pounds 66° Baumé acid per gallon of oil to the oil in a single treatment, passing the oil at a temperature below 140° F. through a bed of clay so as to remove substantially all of the sludge produced by the acid reaction upon the oil, and then passing the oil through a separate decolorizing operation wherein the oil is treated with a decolorizing clay.

6. A process of refining hydrocarbon lubricating oil which requires the use of about 1 to 1½ pounds of 66° Baumé acid per gallon of oil for removal of impurities, which process comprises adding to the oil such acid in an amount equivalent to between one pound and one and one-half pounds 66° Baumé acid per gallon of oil in a single treatment, settling a part of the sludge from the acid, then passing the oil with the remaining sludge through a bed of clay sufficient to remove substantially all of the sludge and at a temperature below 140° F., and then passing the oil through a separate decolorizing operation at a temperature below 140° F. wherein the oil is treated with a decolorizing clay.

Signed this 25th day of September, 1926.

ARTHUR L. LYMAN.